June 16, 1942.   D. C. SCOTT   2,286,651
TESTING MACHINE
Filed Aug. 24, 1940   2 Sheets-Sheet 2
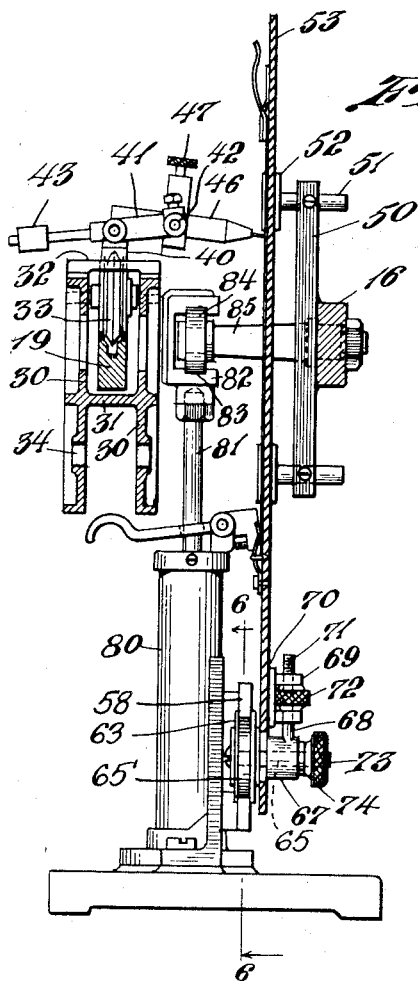
Fig. 4.
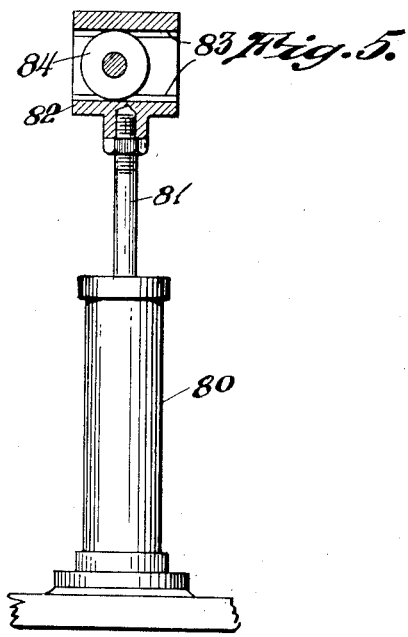
Fig. 5.
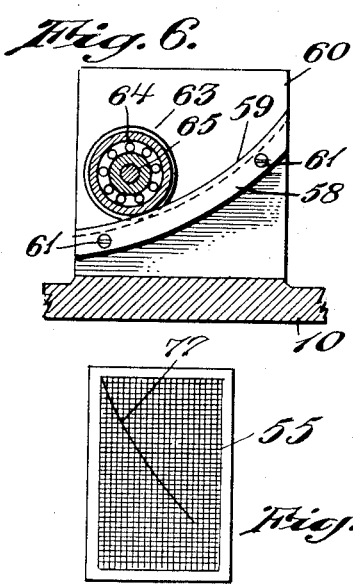
Fig. 6.
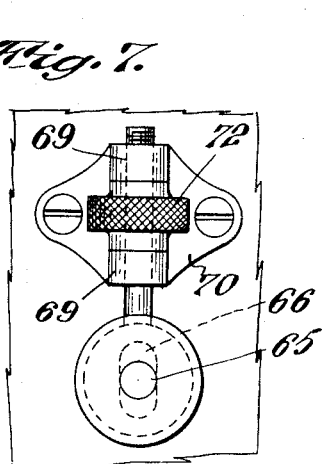
Fig. 7.
Fig. 8.
INVENTOR.
David C. Scott
BY Barlow & Barlow
ATTORNEYS.

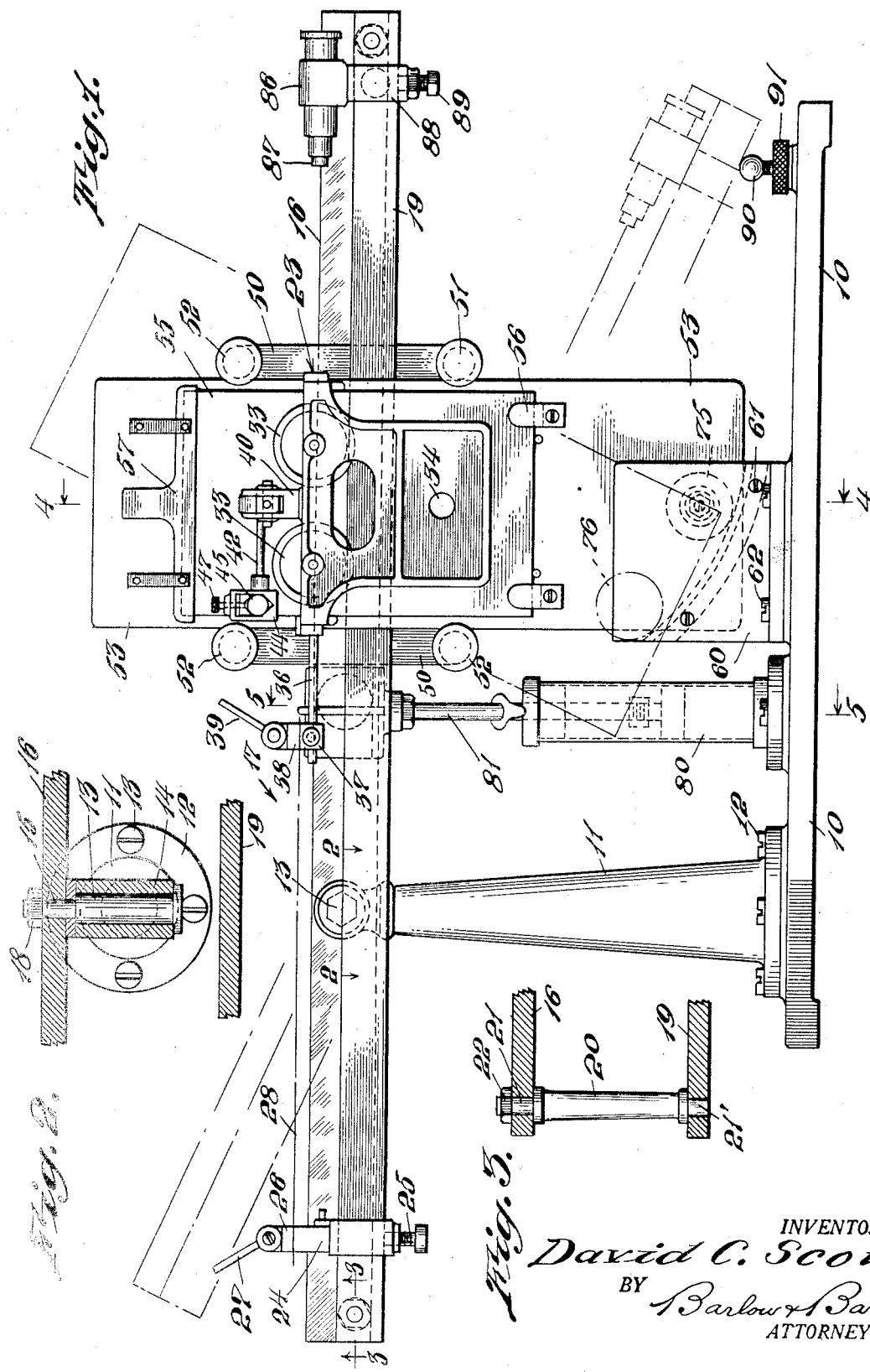

Patented June 16, 1942

2,286,651

UNITED STATES PATENT OFFICE 2,286,651

TESTING MACHINE

David C. Scott, Providence, R. I., assignor to Henry L. Scott Company, a corporation of Rhode Island Application August 24, 1940, Serial No. 354,009

8 Claims. (Cl. 265—2)

This invention relates to a machine for testing the strength and stretch of materials in which the load is applied by the rolling of the weight along an inclined plane with a means to record the results of the test which is performed.

An object of the invention is to provide a mechanism whereby the graphic record of the test performed will have the line of this test extending from the upper lefthand corner downwardly and to the right of the graph paper as the test progresses.

Another object of the invention is the provision of mechanism for recording a graphic test so that the record will be readily visible as the record of the test is made during the performance of the same.

Another object of the invention is to make a more positive control for the platen than that provided by cords extending over pulleys or drums.

Another object of the invention is to provide a very simple adjustment whereby the zero point of the graphic record may be brought into certain registry which is desired.

In carrying out this invention I have mounted the platen which carries the record sheet so that it will freely move against the force of gravity at generally right angles to the inclinable beam which carries the track along which the weight is rolled, and I cause this platen to swing about the pivot of the beam over a supporting surface and move upwardly relative to the beam by the shape of the support beneath the same acting as a cam for controlling the movement of the platen.

With these and other objects in view, the invention consists of certain novel features of construction, as will be more fully described, and particularly pointed out in the appended claims.

In the accompanying drawings:

Fig. 1 is a side elevation of a machine formed in accordance with this invention;

Fig. 2 is a section on line 2—2 of Fig. 1;

Fig. 3 is a section on line 3—3 of Fig. 1;

Fig. 4 is a sectional view on substantially line 4—4 of Fig. 1;

Fig. 5 is a section on substantially line 5—5 of Fig. 1 but showing the dashpot in full lines;

Fig. 6 is a detail showing the cam follower in section and in engagement with the cam, the same being a section on substantially line 6—6 of Fig. 4;

Fig. 7 is a detail of the adjustment mechanism for the cam follower;

Fig. 8 is a plan view of a graphic record made on the machine.

With reference to the drawings, 10 designates the base; 11 is an upright support bolted thereto as at 12. A journal 14 is provided at the upper end of this support to pivotally mount a beam 17 on the stud 13. The stud 13 is reduced as at 15 and has one portion 16 of the beam secured thereto as by nut 18 threaded onto the end of the reduced portion 15. The other portion 19 of the beam is connected to the portion 16 at both ends by reason of a strut 20 reduced as at 21, 21' at both ends entering the portions 16 and 19 and secured to these portions in any suitable manner such, for instance, as by a tight fit of 21' in portion 19 and by nut 22 on the reduced portion 21 passing through portion 16. In this manner the portion 19 of the beam is spaced from the portion 16 throughout its length and serves as a track for a carriage designated generally 23 to be rolled therealong.

Upon this track 19 there is adjustably supported a clamp 24 held in a selected position along the beam by the set screw 25 and providing movable jaw 26 operated by handle 27 for clamping one end of the specimen 28 to anchor it in position.

The carriage 23 consists of a frame-like structure having spaced side portions 30 (see Fig. 4) which are suitably connected as at 31 and at 32 to space these portions sufficiently to lie on either side of the track 19. These portions journal the wheels 33 of the carriage which wheels are V-shaped on their edge intermediate the width thereof with spaced rolling portions as more fully shown in Fig. 6 of my Patent No. 2,205,579. The portions of the sides 30 below the connection 31 are provided with openings 34 to receive a pin for supporting additional weights if it is desired that the carriage be made heavier. The amount of weight added may be calculated on a predetermined calibration in accordance with cross sectional areas of the specimens to be tested whereby uniform and comparable recordings may be had.

This carriage is free to roll along the track and carries an arm 36 upon which there is adjustably secured a clamp 37 having a movable jaw 38 operated by hand lever 39 for gripping the specimen 28 so as to apply load to the specimen as the beam is tilted from a horizontal position. The carriage also carries an upwardly extending boss 40 in which there is pivotally mounted a rockable member 41, which carries at one end an arm 42 counterbalanced as at 43, and on this arm there is mounted a member 44 having opening 45 in which a pencil or some other marking device 46 may be held by reason of the set screw 47. The weighting of this pencil and its carrier is such that it will maintain engagement with the chart by reason of the balance of the same on its pivotal mounting.

The portion 16 of the beam is provided with a pair of spaced arms 50 having shafts 51 for mounting the anti-friction rolls 52, each of which is grooved to receive within it the platen 53 to guide the movement of the platen 53 in a path at right angles to the beam. These guides are eccentrically mounted in a usual way (not shown) and may be adjusted toward and from each other through their mounting so that the minimum amount of play is provided. This platen carries suitable recording material such as a sheet of paper 55, the same being supported in position at one end by clips 56 and at the other end by a spring jaw 57. The platen 53 extends to a point adjacent the base 10 and is there supported through a cam 58 having surface 59 which is generally on the arc of a circle, the same being solid and fixed to a support 60 by screws 61 which support is in turn fixed to the base by bolt 62. A cam follower 63 is mounted on ball bearings 64 carried by shaft 65 extending through the slot 66 in the platen and held at the rear surface of the platen by boss 67 which is supported by a pin 68 extending upwardly through arms 69 in bracket 70 on the platen and which pin is threaded as at 71 being engaged by a nut 72 located between the arms 69 so that upon movement of this nut the pin and its boss 67 at the end thereof will be raised or lowered with reference to the platen so that the zero point on the chart may be adjusted. The shaft 65 is provided with flange 65' of a size to engage the surface about the slot 66 at the front of the platen and is threaded at its end 73 and a hand nut 74 engages these threads so as to force the boss 67 against the platen on the back side of the slot 66 thereof for binding this boss and shaft 65 in position.

The cam follower 63 is located substantially centrally of the platen, although not necessarily so, and the cam is so located with respect to the platen that the cam surface 59, when generated to permit the platen to move proportionally to the load applied, will be somewhat elliptical in contour but sufficiently near to a true arc of a circle that, for all practical purposes in the instant case, this cam surface 59 will be generated on the arc of the near circle. As the beam tilts, the platen will be moved from the full line position to the dotted line position shown in Fig. 1 and the cam follower will roll along the cam upwardly thereof from the position designated 75 to the position designated 76, causing the platen to move upwardly with reference to the beam as shown. The line 77 (see Fig. 8) on the graph paper 55 will be drawn from the upper lefthand corner downwardly and to the right, and the surface of the cam 59 will be such that the movement of the platen will be proportional to the load applied.

The carriage and platen are located at one side of the pivot 13 so that gravity will tend to move this side of the beam downwardly. The beam, however, is controlled in a downward movement by a dashpot 80 mounted on the base 10 and having a plunger rod 81 extending upwardly therefrom for mounting a U-shaped cross head 82 forming guide tracks 83 for engaging the roll 84 at one end of a stud 85 extending forwardly from the portion 16 of the beam. This roll may move along the cross head to the necessary extent to permit of the pivoting of the beam. In operation it is merely necessary to release the dashpot valve and permit slow tilting of the beam under the influence of gravity.

As the beam tilts the load will be applied to the specimen 28 until the same breaks, whereby the carriage will move to engage the cushioning mechanism 86 having a rubber bumper 87 at its end and adjustable by means of the bracket 88 and set screw 89 to the desired location on the beam. The base may be also equipped with a bumper 90 for engaging the beam at a desired location and which is adjustably mounted and held in set position by thumb nut 91.

I claim:

1. In a testing machine, a normally horizontal tiltably mounted track, means for anchoring one end of a specimen to said track, a carriage on the track to which the free end of the specimen is secured and tending to move along the track upon tilting of the track from a horizontal position to apply tension to the specimen increasing as the angle of tilt of the track is increased from a horizontal position, a platen for a chart, guides tiltable with the track for directing movement of the platen at right angles to the track, a fixed cam supporting surface engaged by some portion carried by the platen to control and cause movement of said platen against the force of gravity proportional to the load applied on the specimen, and marking means movable in response to movement of the carriage relative to the track to record on the chart the movement of the carriage along the track.

2. In a testing machine, a normally horizontal tiltably mounted track, means carried by the track for anchoring one end of a specimen, a carriage on the track to which the free end of the specimen is secured and tending to move along the track upon tilting of the track from a horizontal position to apply tension to the specimen increasing as the angle of tilt of the track is increased from a horizontal position, a platen for a chart, guides tiltable with the track for directing movement of the platen at right angles to the track, such movement of the track occurring by gravity, a cam fixed with reference to movement of said track, and a cam follower carried by the platen and adjustable thereon and engaging the cam to move thereover in response to the tilting of the track to cause relative movement of the platen and track proportional to the load applied on the specimen, and marking means movable in response to movement of the carriage relative to the track to record on the chart the movement of the carriage along the track.

3. In a testing machine, a normally horizontal tiltably mounted track, means carried by the track for anchoring one end of a specimen, a carriage on the track to which the free end of the specimen is secured and tending to move along the track upon tilting of the track from a horizontal position to apply tension to the specimen increasing as the angle of tilt of the track is increased from a horizontal position, a platen for a chart, guides tiltable with the track for directing movement of the platen at right angles to the track, such movement of the track occurring by gravity, an upwardly directed cam surface fixed with reference to movement of said track and a cam follower carried by said platen and engaging the cam surface to move thereover in response to the tilting of the track to cause upward movement of the platen relative to the track against the action of gravity, proportional to the load applied on the specimen, and marking means movable in response to movement of the carriage relative to the track to record on the chart the movement of the carriage along the track.

4. In a testing machine, a normally horizontal tiltably mounted track, means carried by the track for anchoring one end of a specimen, a carriage on the track to which the free end of the specimen is secured and tending to move along the track upon tilting of the track from a horizontal position to apply tension to the specimen increasing as the angle of tilt of the track is increased from a horizontal position, a platen for a chart, guides tiltable with the track for directing movement of the platen at right angles to the track, such movement of the track occurring by gravity, a supporting cam engaged by some portion carried by the platen due to the gravity of the platen causing movement of the platen relative to the track upon tilting movement of the track, said cam presenting a surface to said portion to cause movement of the platen proportional to the load applied on the specimen, and marking means movable in response to movement of the carriage relative to the track to record on the chart the movement of the carriage along the track.

5. In a testing machine, a normally horizontal tiltably mounted track, means carried by the track for anchoring one end of a specimen, a carriage on the track to which the free end of the specimen is secured and tending to move along the track upon tilting of the track from a horizontal position to apply tension to the specimen increasing as the angle of tilt of the track is increased from a horizontal position, a platen for a chart, guides tiltable with the track for directing movement of the platen at right angles to the track, such movement of the track occurring by gravity, an upwardly directed cam fixed with reference to movement of said track, and a cam follower carried by the platen and engaging the cam to move thereover in response to the tilting of the track to cause upward movement of the platen relative to the track against the action of gravity, said cam presenting a surface to said follower to cause movement of the platen proportional to the load applied on the specimen, and marking means movable in response to movement of the carriage relative to the track to record on the chart the movement of the carriage along the track.

6. In a testing machine, a normally horizontal tiltably mounted track, means carried by the track for anchoring one end of a specimen, a carriage on the track to which the free end of the specimen is secured and tending to move along the track upon tilting of the track from a horizontal position to apply tension to the specimen increasing as the angle of tilt of the track is increased from a horizontal position, a platen for a chart, guides tiltable with the track for directing movement of the platen at right angles to the track, such movement of the track and guides occurring by gravity, a cam fixed with reference to movement of said track, a cam follower and means to adjustably secure said follower on the platen, the contour of said cam having the form of an arc of a circle to cause movement of the platen proportional to the load applied on the specimen and marking means movable in response to movement of the carriage relative to the track to record on the chart the movement of the carriage along the track.

7. In a testing machine, a normally horizontal tiltably mounted track, means carried by said track for supporting a specimen to be tested, a carriage on the track tending to move along the track upon tilting of the track from a horizontal position to apply a strain to the specimen increasing as the angle of tilt of the track is increased from a horizontal position, a platen for a chart, guides tiltable with the track for directing movement of the platen at right angles to the track, a fixed cam supporting surface engaged by some portion carried by the platen to control and cause movement of said platen against the force of gravity proportional to the load applied on the specimen, and marking means movable in response to the movement of the carriage relative to the track to record on the chart the movement of the carriage along the track.

8. In a testing machine having means thereon for supporting one end of a specimen and movable means for supporting and loading the other end of said specimen, a recording device for recording the result of a test applied to a specimen, comprising guides associated with said movable means and movable therewith, a platen for a chart supported on said guides and slidable thereon and guided in its movements thereby, said platen being by gravity urged to slidably move on said guides, a cam surface fixed relative to said supporting means and engaged by some portion carried by the platen to control and cause movement of said platen in said guides against the force of gravity proportional to the load applied on the specimen, and marking means associated with the second said means and actuated thereby for movement over said chart to record thereon the result of said test.

DAVID C. SCOTT.